United States Patent
Wildnauer et al.

(10) Patent No.: US 7,280,206 B2
(45) Date of Patent: Oct. 9, 2007

(54) METHOD AND APPARATUS TO IMPROVE THE DYNAMIC RANGE OF OPTICAL DEVICES USING SPATIAL APODIZATION

(75) Inventors: Kenneth R. Wildnauer, Santa Rosa, CA (US); William Richard Trutna, Jr., Atherton, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 397 days.

(21) Appl. No.: 10/939,673

(22) Filed: Sep. 13, 2004

(65) Prior Publication Data

US 2006/0055926 A1    Mar. 16, 2006

(51) Int. Cl.
*G01J 3/28*    (2006.01)
*G01J 3/18*    (2006.01)

(52) U.S. Cl. ................................. 356/328; 356/334

(58) Field of Classification Search ................ None
See application file for complete search history.

(56) References Cited

U.S. PATENT DOCUMENTS

| | | | | |
|---|---|---|---|---|
| 5,784,158 | A * | 7/1998 | Stanco et al. | 356/326 |
| 5,859,424 | A * | 1/1999 | Norton et al. | 250/226 |
| 6,008,941 | A | 12/1999 | Feldman et al. | |
| 6,545,808 | B1 * | 4/2003 | Ehbets et al. | 359/566 |
| 6,583,877 | B2 * | 6/2003 | Norton | 356/369 |
| 6,591,039 | B2 * | 7/2003 | Rondinella et al. | 385/37 |
| 6,674,526 | B1 * | 1/2004 | Marbach | 356/300 |
| 6,694,075 | B1 * | 2/2004 | Bhatia et al. | 385/37 |
| 6,753,118 | B2 * | 6/2004 | Deshmukh et al. | 430/30 |
| 6,816,648 | B2 * | 11/2004 | Goldstein | 385/37 |
| 2001/0046087 | A1 * | 11/2001 | Hoose | 359/573 |
| 2003/0186142 | A1 * | 10/2003 | Deshmukh et al. | 430/30 |
| 2006/0055926 | A1 * | 3/2006 | Wildnauer et al. | 356/328 |
| 2006/0056028 | A1 * | 3/2006 | Wildnauer | 359/575 |

FOREIGN PATENT DOCUMENTS

WO    WO 00/02068    6/1999

OTHER PUBLICATIONS

Melles Griot 1995/96 catalog, p. 7-2.*
Robledo-Sanchez, Carlos et al., "Binary Grating with Variable Bar/Space Ration Following a Geometrical Progression", Optics Communications, 119, 1995, pp. 465-470.

* cited by examiner

Primary Examiner—Gregory J. Toatley, Jr.
Assistant Examiner—Jonathan Skovholt

(57) ABSTRACT

Devices and methods for processing multi-wavelength light beams and the single-wavelength components of such light beams are disclosed. In accordance with some embodiments, a spectral filter includes collimating and focusing optical elements, an apodizing filter, a diffraction grating, and a spatial filter. The collimating optical element collimates an input light beam while the apodizing filter spatially filters this beam. In general, the apodizing filter includes a range of transmissivity that varies according to a distance from a predetermined location on the apodizing filter. The diffraction grating diffracts the input beam which is focused by the focusing optical element onto the spatial filter to generate a filtered output beam. Embodiments of the invention may be employed as spectral filters, optical spectrum analyzers, optical mutiplexers, optical de-multiplexers, and the like.

39 Claims, 14 Drawing Sheets ically lower than component 130.

METHOD AND APPARATUS TO IMPROVE THE DYNAMIC RANGE OF OPTICAL DEVICES USING SPATIAL APODIZATION

BACKGROUND

1. Related Application

This application is related to U.S. patent application Ser. No. 10/939,674 entitled "Apodized Diffraction Grating With Improved Dynamic Range" of Kenneth R. Wildnauer, which is filed on the same day as this application and is assigned to the assignee of this application.

2. Discussion of Related Art

Modern research and technology have created major changes in the lives of many people. A significant example of this is fiber optic communication. Over the last two decades, optical fiber lines have taken over and transformed the long distance telephone industry. Optical fibers also play a dominant role in making the Internet available around the world. When optical fiber replaces copper wire for long distance calls and Internet traffic, costs are dramatically lowered and the rate at which information can be conveyed is increased.

To maximize bandwidth, that is, the rate at which information can be transmitted, it is generally preferable for multiple information streams to be conveyed over the same optical fiber using multiple optical signals. Each optical signal is a light beam having a wavelength that is unique among the optical signals that share the optical fiber. Optical communication systems rely on optical devices that operate with single wavelength light beams that include a single optical signal, and with multi-wavelength light beams that include multiple optical signals. Such optical devices include, among others, spectral filters.

A spectral filter receives an input light beam that includes two or more spectral components that have different wavelengths. The filter selects and outputs only those input beam components that have wavelengths within a narrow range. This range is determined by the characteristics of the spectral filter. The center of the range defines the wavelength of the spectral filter.

It is desirable for a spectral filter to separate light beam components having only small wavelength differences. Small wavelength differences in light beam components are desirable because, for example, the conventional or "C" optical communication band can only support up to about 40 independent optical signals that are separated in wavelength by an increment of about 200 gigahertz (GHz). However, if the optical communication system can support wavelengths that differ by only about 25 GHz, then the "C" band can support over 150 independent signals.

Light beam components separated by only small wavelength increments can be combined into a densely packed multi-wavelength beam. Using such a light beam enables an optical communication system to convey a large amount of information over a single optical fiber. However, such dense packing requires precise combination, separation, and other handling of these light beams.

FIG. 1A is a graph showing a multi-wavelength beam superimposed on the transmission spectrum of an exemplary spectral filter. Transmission spectrum 110 is graphed as the logarithm of the intensity of the light transmitted by the spectral filter, with respect to the wavelength of the light.

The multi-wavelength light beam depicted in FIG. 1A has two light beam components 120 and 130. Each light beam component 120 and 130 has a single wavelength, and each component is graphed as the logarithm of the intensity of the component at the particular wavelength of the component. Notably, the intensity of component 120 is substantially lower than component 130.

Transmission spectrum 110 includes a single primary peak 112 and a number of side lobes 114. The center of primary peak 112 is the spectral filter wavelength. The wavelength of light beam component 120 coincides with the spectral filter wavelength. Primary peak 112 allows light beams of the spectral filter wavelength to pass through the spectral filter without a substantial decrease in intensity.

Side lobes 114 within transmission spectrum 110 are shown occurring in a periodic pattern as the wavelength of the light varies. Side lobes 114 decrease in intensity as the wavelength difference increases between a particular side lobe and primary peak 112. The wavelength of component 130 is shown coinciding with one of the stronger side lobes.

Side lobes 114 may affect system performance since they allow light at undesired wavelengths to pass through the spectral filter. For example, consider the scenario of the multi-wavelength beam shown in FIG. 1A, denoted by components 120 and 130, which are communicated to a spectral filter having the transmission spectrum shown in FIG. 1A. The desired output from the spectral filter would be all of light beam component 120, while all of light beam component 130 is blocked. However, as shown in FIG. 1B, this not always possible.

FIG. 1B is a graph showing the intensity of the light transmitted by a spectral filter having the transmission spectrum shown in FIG. 1A. The intensity of light beam components 121 and 131 represent the output that would be provided by the spectral filter.

Output component 121 typically has about the same intensity as input component 120 since the wavelength of the spectral filter transmits substantially all of the input light at that particular wavelength. However, output component 131 has a much lower intensity than input component 130 because the spectral filter substantially attenuates light at the wavelength of this component. Output component 131 has a somewhat higher intensity than output component 121 because input component 130 has a substantially higher intensity than input component 120. In general, the spectral filter described in FIG. 1A cannot readily be used with a multi-wavelength input light beam since it is difficult or impossible to detect input component 121 because of interference from component 131. In addition, many conventional spectral filters have limited transmission width and rejection shape, which fall below the requirements of modern optical communication systems.

SUMMARY OF THE INVENTION

In accordance with some embodiments, a spectral filter may include collimating and focusing optical elements, an apodizing filter, a diffraction grating, and a spatial filter. The collimating optical element collimates an input light beam while the apodizing filter spatially filters this beam. In general, the apodizing filter includes a range of transmissivity that varies according to a distance from a predetermined location on the apodizing filter. The diffraction grating diffracts the input beam which is focused by the focusing optical element onto the spatial filter to generate a filtered output beam. Embodiments of the invention may be employed as spectral filters, optical spectrum analyzers, optical multiplexers, optical de-multiplexers, and the like.

BRIEF DESCRIPTION OF THE DRAWING

The above and other aspects, features and advantages of the present invention will become more apparent upon consideration of the following description of preferred embodiments taken in conjunction with the accompanying drawing figures, wherein.

DETAILED DESCRIPTION OF THE PREFERRED EMBODIMENTS

In the following detailed description, reference is made to the accompanying drawing figures which form a part hereof, and which show by way of illustration specific embodiments of the invention. Other embodiments may be utilized, and structural, electrical, as well as procedural changes may be made without departing from the scope of the present invention.

Figure 2A:
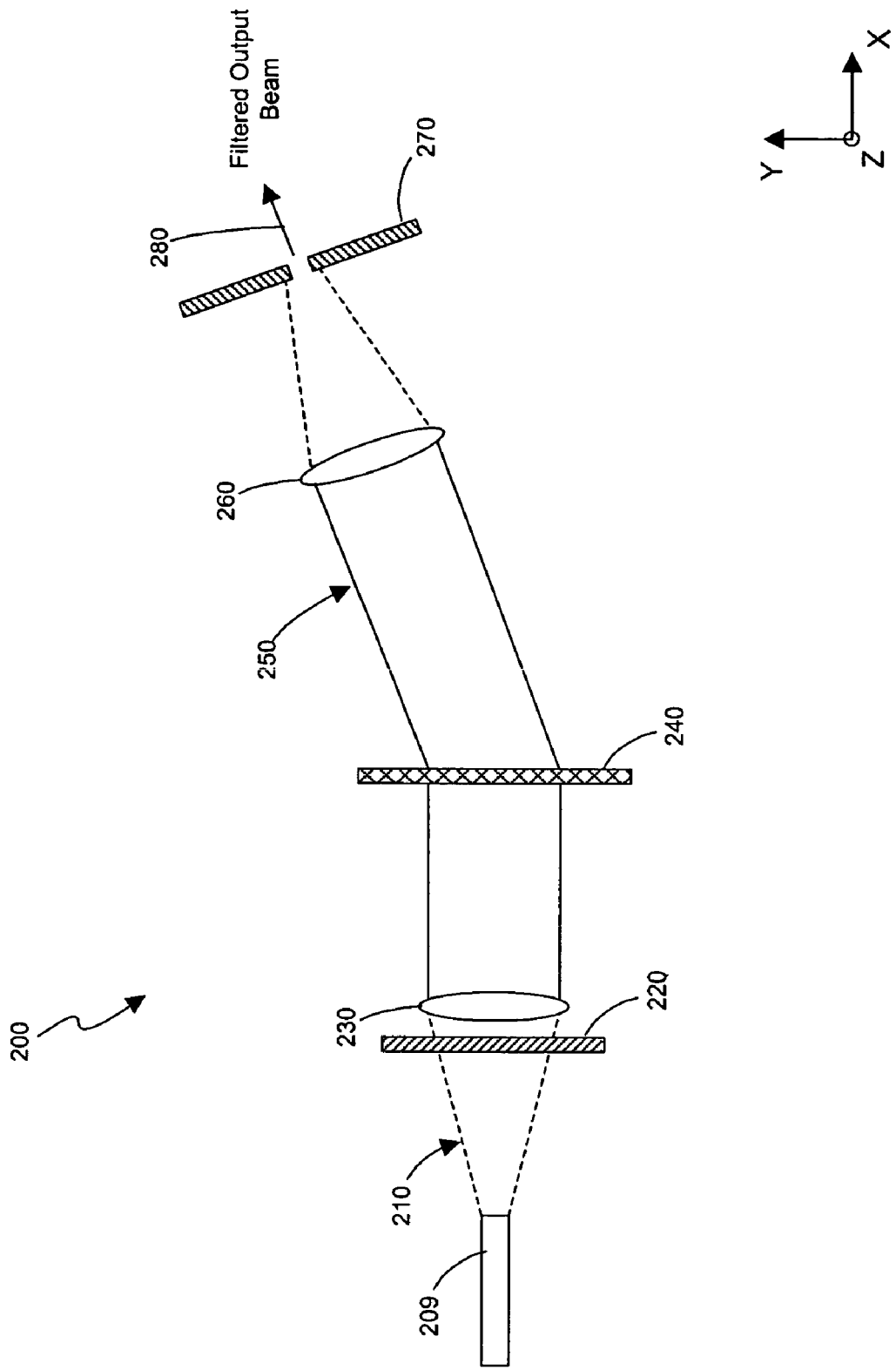
FIG. 2A is a block diagram showing a spectral filter in accordance with an embodiment of the invention.
Figure 6A:
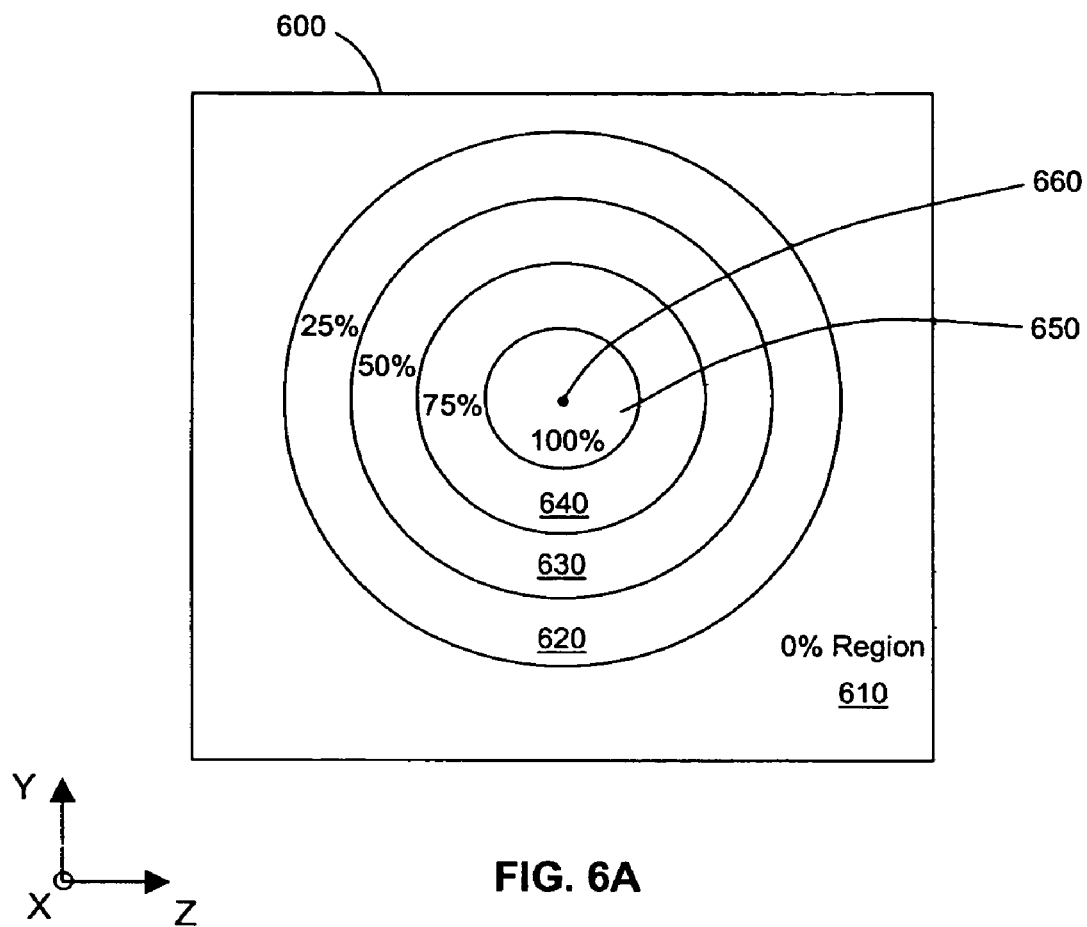
FIG. 6A is a front view of one type of apodization filter that may be implemented in the invention.

FIG. 2A is a block diagram showing spectral filter 200 in accordance with one embodiment of the invention. Filter 200 generally includes apodization filter 220, diffraction grating 240 optically disposed between imaging components 230 and 260, and spatial filter 270. The apodization filter is shown positioned between input source 209 and imaging component 230, and may be implemented using any of a variety of optical devices that can apodize an input light beam. In general, the apodization filter includes a range of transmissivity that varies according to a distance from a predetermined location on the apodizing filter. In use, the filter spatially filters the input light beam according to the varying range of transmissivity. A particular example of a suitable apodization filter that may be used to implement apodization filter 220 is depicted in FIG. 6A and will be described in more detail with reference to that figure.

Referring still to FIG. 2A, input source 209 may be any suitable device for introducing input light beam 210, which comprises spatially limited light, into the spectral filter. For example, the input source may be a filtering device having a pinhole or slit, an optical waveguide, a single mode or multi-mode optical fiber, and the like. Imaging component 230 is an optical device that collimates a diverging light beam, while imaging component 260 is an optical device that focuses a collimated light beam. Output imaging element 260 is typically implemented to reduce the distance that output beam 250 must travel before a selected light beam component spatially overlaps at a single point. Output imaging element 260 also controls the size of the filtered output beam, which could, for example, be matched to the mode size of an optical fiber for efficient coupling to the fiber. This reduction in distance may be achieved by focusing the output beam onto spatial filter 270. Reducing the travel distance of the output beam enables the fabrication of smaller sized spectral filters.

Spatial filter 270 is an optical device that spatially filters output beam 250 to produce filtered output beam 280, and may be implemented using any of a variety of conventional filtering devices. A particular example, as shown in FIG. 2A, is a filter having a slit formed within an opaque volume or surface. In this configuration, the slit forms a straight line or a curve in the Y-Z plane.

In some implementations, spatial filter 270 may be used to facilitate the combination and separation of multi-wavelength and single-wavelength light beams without undesirable effects such as distortion, cross talk, or spillover among the light beam components. For example, spatial filter 270 may be implemented using an optical device that can capture or detect light and which has a defined dimension in the Y direction. Specific examples of suitable light detecting devices include photodetectors, an array of photodetectors, a photodetector array, CCDs, optical waveguides, and photographic film, among others. These types of optical devices may be configured to resolve a particular wavelength, or a range of wavelengths, to spatially limit the output beam to produce a spectrally filtered output beam 280.

Referring still to FIG. 2A, input source 209 is shown providing input beam 210 to apodization filter 220. Imaging component 230 collimates the apodized input beam and directs this beam onto diffraction grating 240 where the beam is diffracted as output beam 250. The diffracted output beam is received by imaging component 260 which focuses this beam onto spatial filter 270, resulting in filtered output beam 280.

Filter 200 may function as a spectral filter or as an optical spectrum analyzer. Operating as a spectral filter, as described with respect to FIGS. 1A and 1B above, filtered output beam 280 is a component of a multi-wavelength input light beam that has the wavelength defined by the spectral filter.

Depending on what component light beams are present in the input light beam, the filtered output beam provided by the spectral filter may include two or more components of input beam 210, each having a wavelength within the range of wavelengths, typically a narrow range, that is selected by spectral filter 200.

An optical spectrum analyzer may be categorized as a specific type of spectral filter, commonly referred to as a tunable spectral filter. A typical optical spectrum analyzer operates by tuning the spectral filter to a desired wavelength or a range of wavelengths. The required tuning may be accomplished using a suitable positioning mechanism, which will be described in more detail with reference to FIG. 2C.

FIG. 2A shows diffraction grating 240 implemented as a substantially planar grating, but other designs are possible. For example, to reduce or eliminate the need for optical imaging components (for example, imaging components 230 and 260), a non-planer diffraction grating may be used. A diffraction grating that is concave with respect to the input beam would transmit a converging spherical wavefront to the spatial filter.

Imaging components 230 and 260 may be implemented using conventional optical devices that can converge light beams. One example of a suitable device that may be used for imaging components 230 and 260 is a gradient index (GRIN) lens.

The optical properties of a typical GRIN lens are determined by a spatial gradient in the refractive index within the lens, or by a combination of both the shape of the lens and a spatial gradient or refractive index. In some GRIN lenses, the refractive index of the lens is at a maximum value at the center of the lens, decreasing with increased distance from the center. The light transmission of the lens also decreases with increasing distance from the center of the lens so that the lens also apodizes the input light beam.

A particular type of GRIN lens is known as a pitch controlled GRIN lens. The length of such a lens is a particular ratio, such as 25%, of the pitch of the light traveling through the lens. A quarter pitch (or 25% pitch) GRIN lens will collimate a diverging light beam or focus a collimated beam. A pitch of somewhat less than 25% will decrease the divergence of a diverging light beam, and a pitch of somewhat more than 25% will focus a diverging light beam.

Other types of imaging devices that may be used for implementing imaging components 230 and 260 include, among others, a single discrete lens, an assembly of two or more lenses, spherical or aspheric lenses, a cylindrical lens, a parabolic lens, an off-axis parabolic lens, a conic shaped lens, a curved reflector, a beam expander, or a combination of two or more of these devices.

Figure 2B:
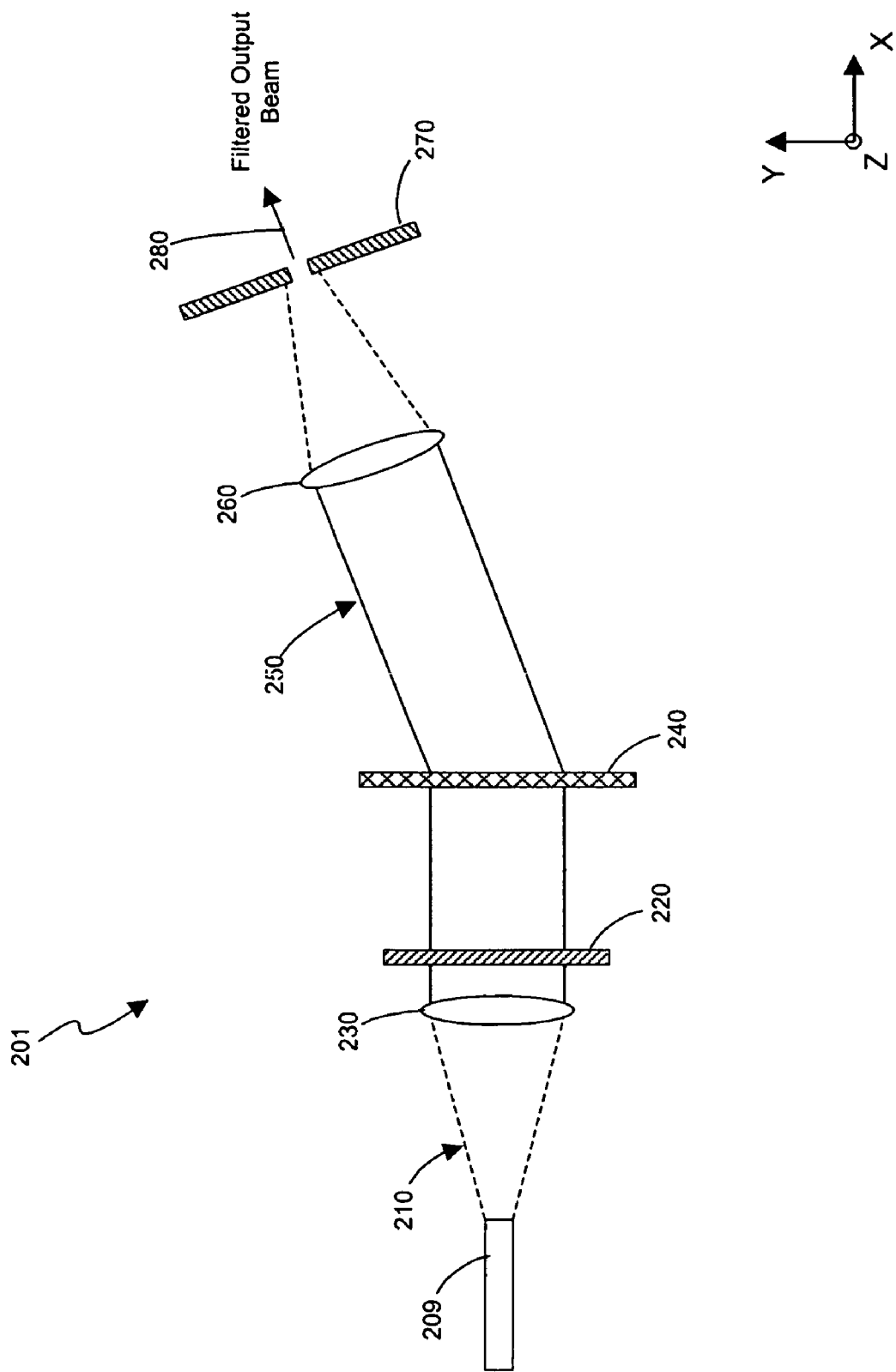
FIG. 2B is a block diagram showing a spectral filter in accordance with an alternative embodiment of the invention.

FIG. 2A provides an example of a spectral filter using apodization filter 220 positioned between imaging component 230 and input source 209. However, the invention is not so limited and alternative configurations are possible. For example, FIG. 2B shows spectral filter 201 having apodization filter 220 optically disposed between imaging component 230 and diffraction grating 240. In this design, the apodization filter is located adjacent to the imaging component. Another alternative may be locating the apodization filter adjacent to the diffraction grating, as depicted in FIG. 2C.

Figure 2C:
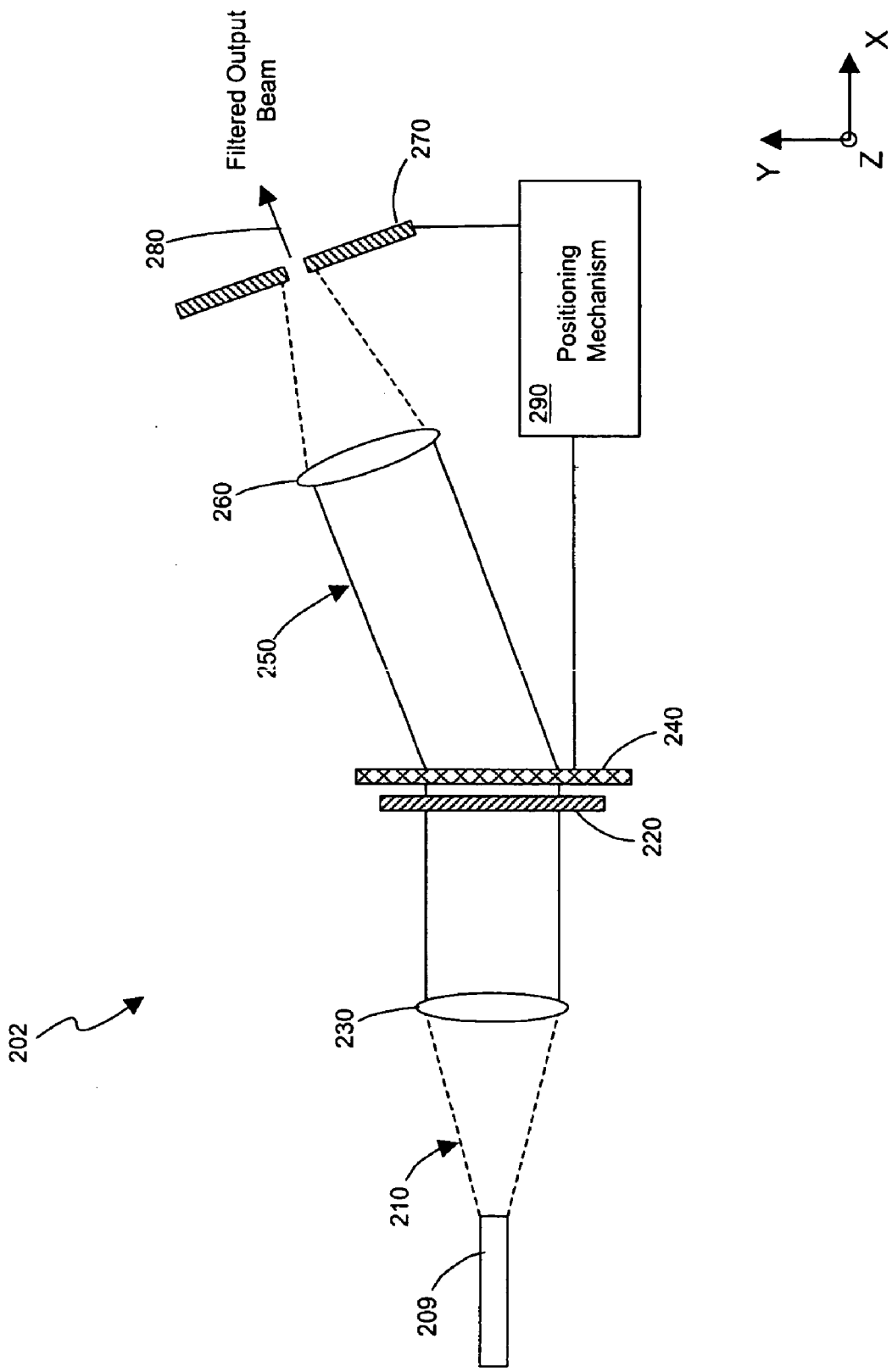
FIG. 2C is a block diagram showing a spectral filter in accordance with another alternative embodiment of the invention.

FIG. 2C also shows spectral filter 202 having optional positioning mechanism 290. The positioning mechanism is typically implemented when spectral filter is used as an optical spectrum analyzer. Positioning mechanism 290 may be used to adjust the angular relationship between optical grating 240 and output filter 270, thereby selecting the wavelength of the component or components within input beam 210 that ultimately result in filtered output beam 280.

The angle at which light is transmitted from diffraction grating 240 depends on both the angle of incidence of the light on the diffraction grating, the period of the lines on the grating, and on the wavelength of the light. Thus, the wavelength of spectral filter 202 may be selected by modifying the angle between imaging component 230 and the axis of diffraction grating 240, or by modifying the angle between the axis of the diffraction grating and spatial filter 270, or by modifying both of these angles. Accordingly, the wavelength of spectral filter 202 may be selected by adjusting both the X and the Y coordinates of spatial filter 270, adjusting the position of imaging components 230 or 260, adjusting the angle of the diffraction grating in the X-Y plane, adjusting the spatial filter along an arc centered at the point of incidence on diffraction grating 240, or making other adjustments of the angular relationships among the various components of spectral filter 202.

Undesirable effects, such as image misfocus and crosstalk, may occur if either imaging component 260 or spatial filter 270 are positioned relative to diffraction grating 240 in a location that does not lie along an arc centered at the center of the diffraction grating. These effects may result in the loss of the light present in the light beam components that are selected. To compensate for these effects, imaging components 230 and 260 may be constructed to reduce defocus and crosstalk, for example, over certain angular displacements.

Figure 2D:
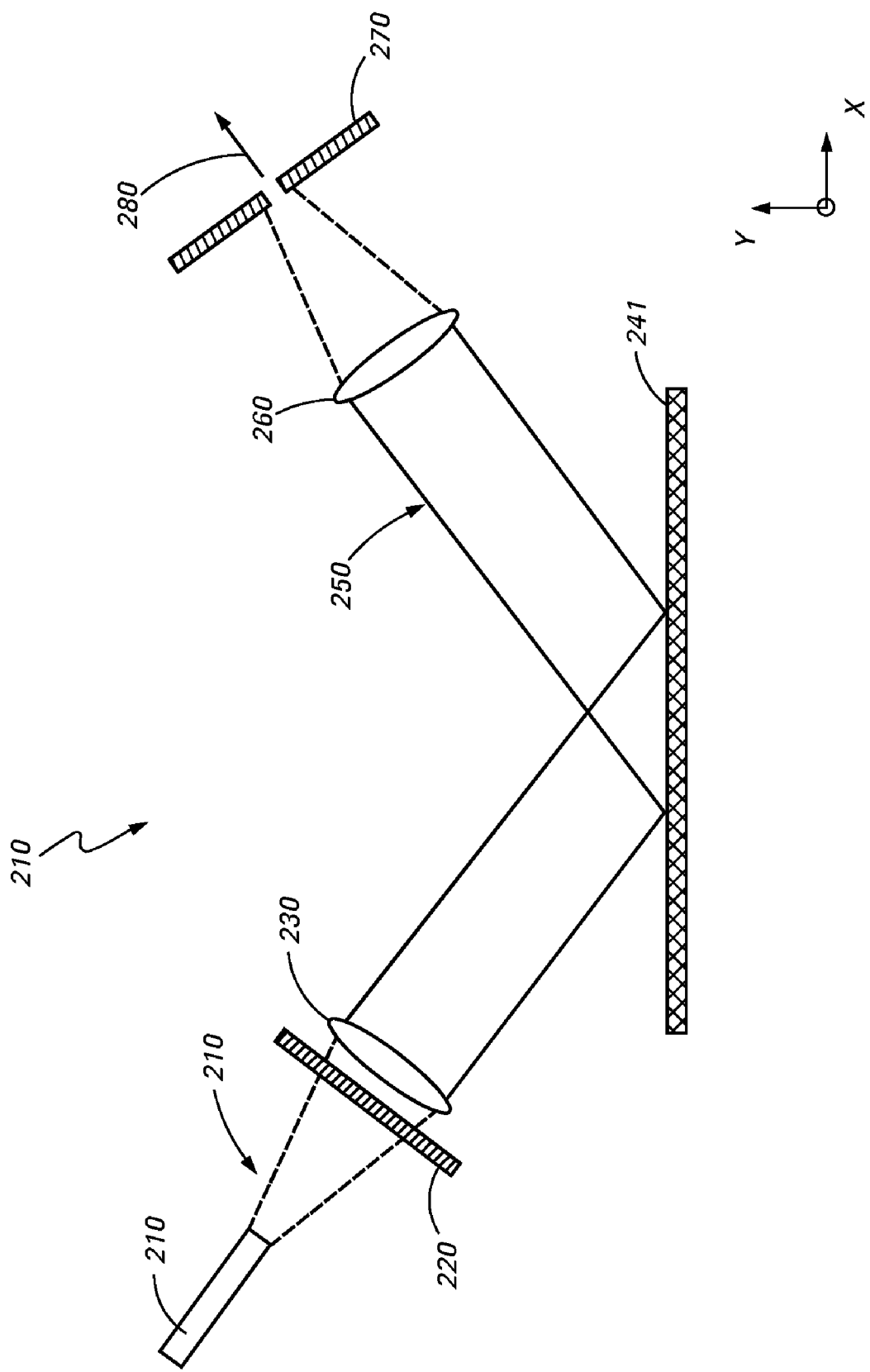
FIG. 2D is a block diagram showing a spectral filter having a reflective diffraction grating.

FIG. 2D is a block diagram showing spectral filter 204, which is similar in many respects to the filters shown in FIGS. 2A-2C. The primary difference between these filters relates to the type of diffraction grating used to implement the spectral filter. The spectral filters shown in FIGS. 2A-2C utilize a transmission diffraction grating 240 which allows at least a portion of an input light beam to pass through the grating. In contrast, spectral filter 204 shown in FIG. 2D implements a reflective diffraction grating 241. Reflective diffraction grating 241 may be implemented using known grating devices that can reflect some or all of the input light beam incident on the grating.

During operation, input source 209 provides input beam 210 to apodization filter 220. Imaging component 230 then collimates the apodized input beam and directs this beam onto diffraction grating 241 where the beam is reflected as output beam 250. The reflected output beam is received by imaging component 260 which focuses the output beam onto spatial filter 270, resulting in filtered output beam 280.

The various spectral filters shown in FIGS. 2A-2D, as well as the multiplexing and demultiplexing devices shown in FIGS. 4A-4C and 5, implement an apodization filter as a separate component that is optically disposed between the input light source and the diffraction grating. However, other design configurations may be used where the functionality of the apodization filter is integrated with imaging component 230 or with diffraction grating 240. Various types of diffraction gratings that can diffract and apodize an input light beam will be described with reference to FIGS. 6A-6B, 7A-7C and 8.

Figure 1A:
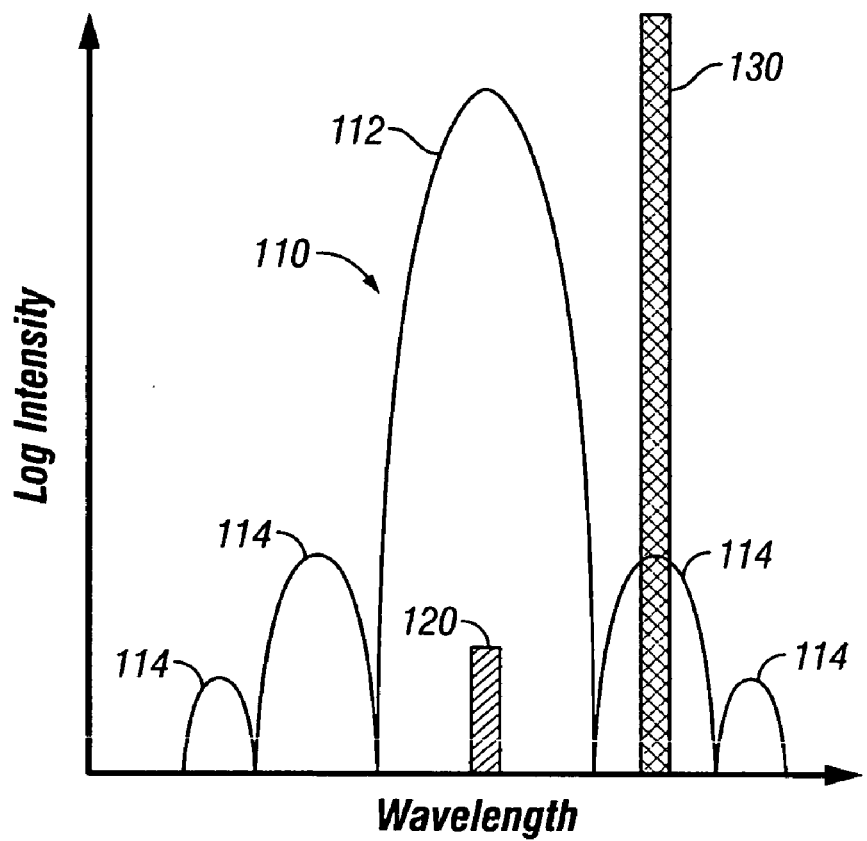
FIG. 1A is a graph showing a multi-wavelength beam superimposed on the transmission spectrum of an exemplary spectral filter.
Figure 1B:
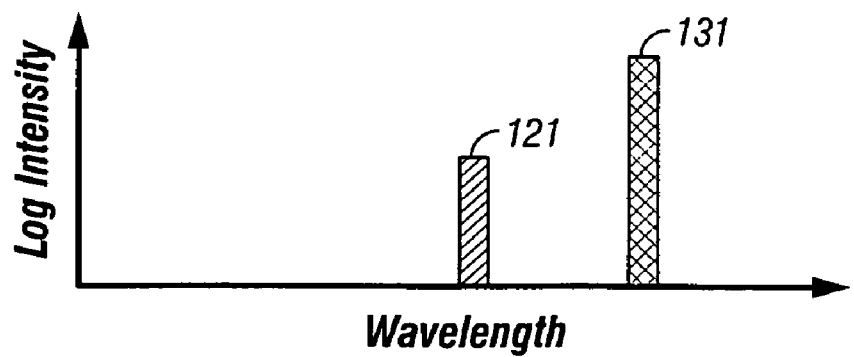
FIG. 1B is a graph showing the spectrum of the multi-wavelength light beam of FIG. 1A after being filtered by the spectral filter whose transmission spectrum is shown in FIG. 1A.
Figure 3:
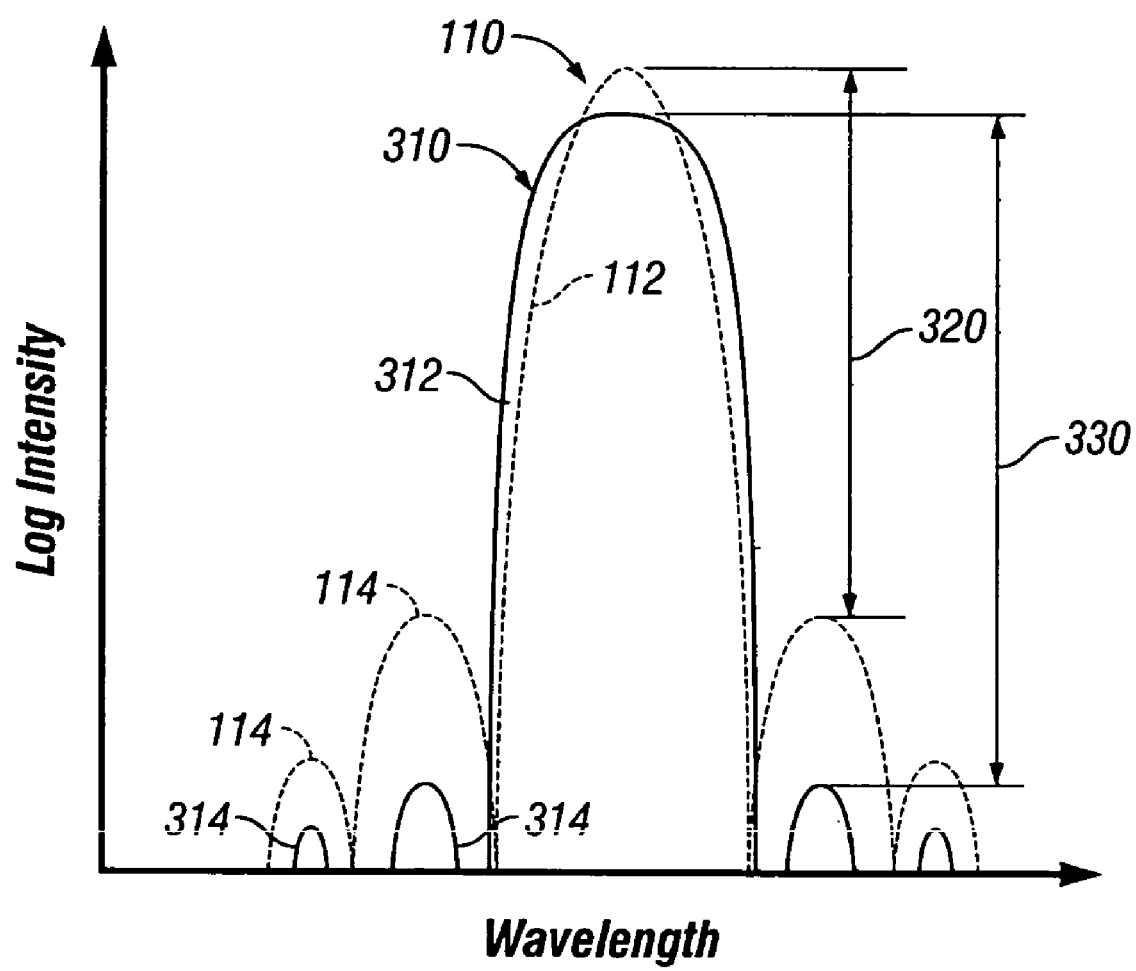
FIG. 3 is a graph comparing the transmission spectrum of FIG. 1A with the transmission spectrum obtained from any of the spectral filters of FIGS. 2A-2D.

FIG. 3 is a graph comparing the transmission spectrum of FIG. 1A with the transmission spectrum obtained from any of the spectral filters of FIGS. 2A-2D. Each transmission spectrum is graphed as the logarithm of the relative intensity of transmission through a spectral filter as a function of the wavelength of the input light beam.

As described above with reference to FIG. 1A, transmission spectrum 110 of the exemplary prior-art spectral filter includes a single primary peak 112 and a number of side lobes 114. The prior-art spectral filter has an intensity difference 320, which is the difference in transmission intensity between primary peak 112 and the strongest side lobe 114. Similarly, transmission spectrum 310 of any of the spectral filters shown in FIGS. 2A-2D include a single primary peak 312 and a number of side lobes 314. The spectral filters shown in FIGS. 2A-2D have an intensity difference 330, which is the difference in transmission intensity between primary peak 312 and the strongest side lobes 314. Intensity differences 320 and 330 indicate the maximum dynamic range of their respective spectral filters.

Comparing the two transmission spectra, the strongest side lobe 314 is significantly lower in transmission intensity than the strongest side lobe 114. Intensity difference 330 of the spectral filters shown in FIGS. 2A-2D is substantially larger than intensity difference 320 of the prior art spectral filter whose transmission spectrum is shown in FIG. 1A. Thus, the maximum dynamic range of the spectral filters shown in FIGS. 2A-2D is substantially larger than the prior-art spectral filter of FIG. 1A.

Further, each side lobe 314 has a significantly narrower wavelength range and a significantly decreased maximum transmission intensity than corresponding side lobe 114. Compared to transmission spectrum 110, transmission spectrum 310 reduces the likelihood that an input light beam component at an undesired wavelength will spill over into the output of the spectral filter.

Moreover, primary peak 312 is significantly wider than primary peak 112, which may allow a somewhat wider range of desired wavelengths to be selected by the spectral filter. A wider spectral range may allow larger tolerances for the wavelengths used as components of a multi-wavelength light beam in an optical communication system. While it is customary to speak of the wavelength of a spectral filter, a spectral filter actually passes a range of wavelengths.

The transmission spectrum of a spectral filter in accordance with the invention depends upon an assortment of design parameters. These design parameters include, among others, the shape, size, pitch, and optical properties of the diffraction lines of the diffraction grating, the relative angular positions of the optical elements within the spectral filter, and the optical characteristics of the imaging components. In some implementations, such as when a diffraction grating also apodizes the input light beam, these design parameters may also include the spatial modulation of diffraction lines, as described in more detail with reference to FIGS. 7A-7C, and 8. The transmission spectrum of the spectral filter may also be modeled mathematically as the convolution of the apodization function of the apodization filter with the diffraction function of the diffraction grating.

Given an ideal apodization function and an ideal diffraction function, it is possible to set the bandwidth of primary peak 312 to any desired value. It is similarly possible to set the maximum intensities of side lobes 314 to any desired value, including making the lobes negligibly small. However, for commercial spectral filters, various limiting factors constrain the wavelength range and dynamic range that may be obtained in a practical spectral filter. It therefore may be desirable to merely reduce the amplitude of the side lobes as a trade off with manufacturing cost or with other design parameters including, among others, the value of the maximum transmission efficiency of primary peak 312.

Figure 4A:
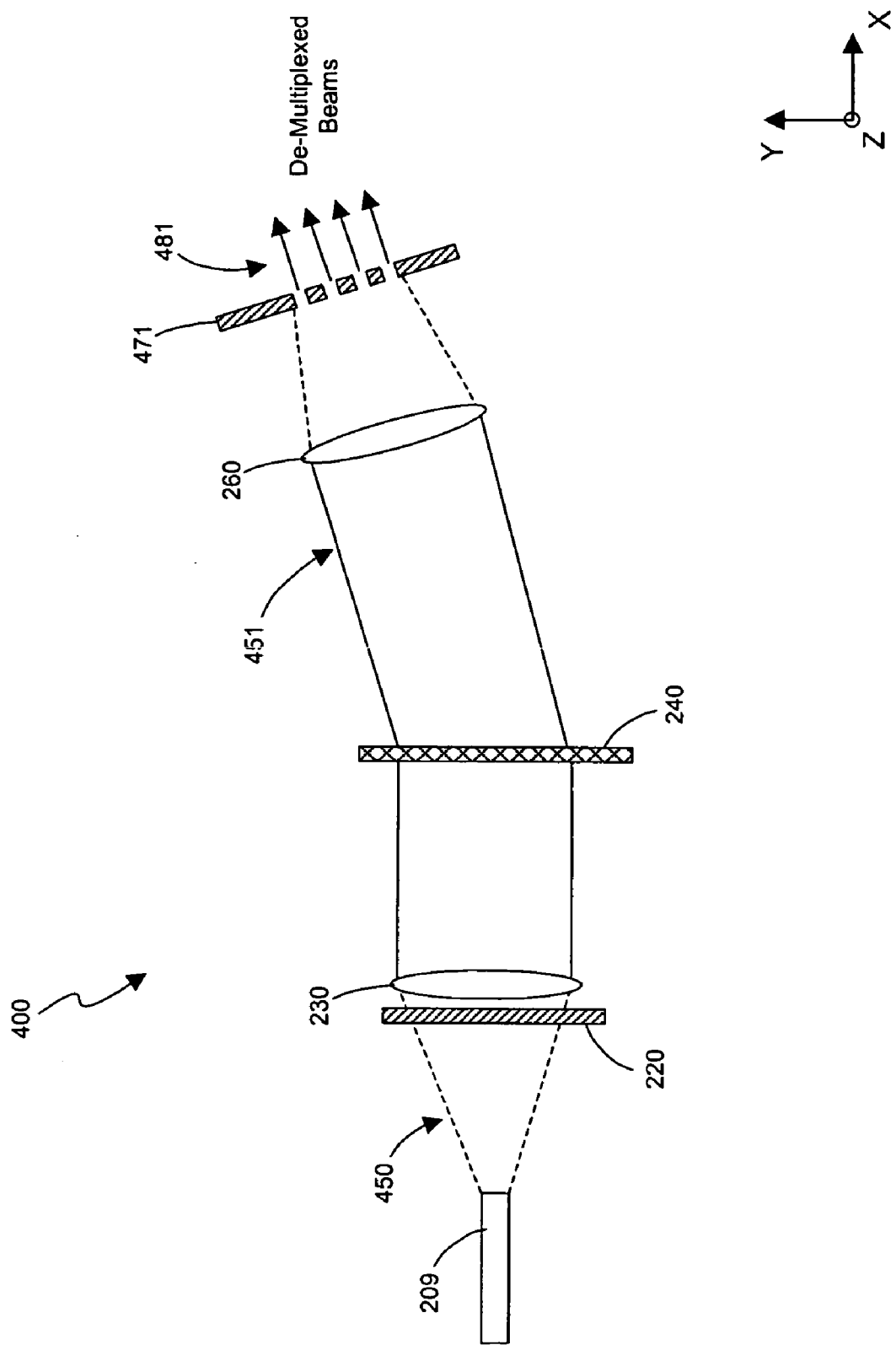
FIG. 4A is a block diagram showing an optical demultiplexer in accordance with the invention.

FIG. 4A is a block diagram showing optical demultiplexer 400 in accordance with one embodiment of the invention. Demultiplexer 400 generally includes apodization filter 220, diffraction grating 240 optically disposed between imaging components 230 and 260, and spatial filter array 471. The apodization filter is shown positioned between input source 209 and imaging component 230. In this embodiment, input source 209 introduces multi-wavelength input light beam 450 into de-multiplexer 400.

Spatial filter array 471 is shown configured with individual spatial filters that separate output beam 451 into demultiplexed light beams 481. Each of the demultiplexed light beams includes a component of input beam 450 at a different wavelength, or components of the input beam within a different range of wavelengths. Spatial filter array 471 may be implemented using any of the optical devices described in reference to spatial filter 270.

During operation, input source 209 provides multi-wavelength input beam 451 to apodization filter 220. Imaging component 230 collimates the apodized input beam and directs this beam onto diffraction grating 240. The diffracted input beam is then received by imaging component 260 which focuses output beam 451 onto spatial filter array 471, resulting in two or more demultiplexed light beams 481.

Figure 4B:
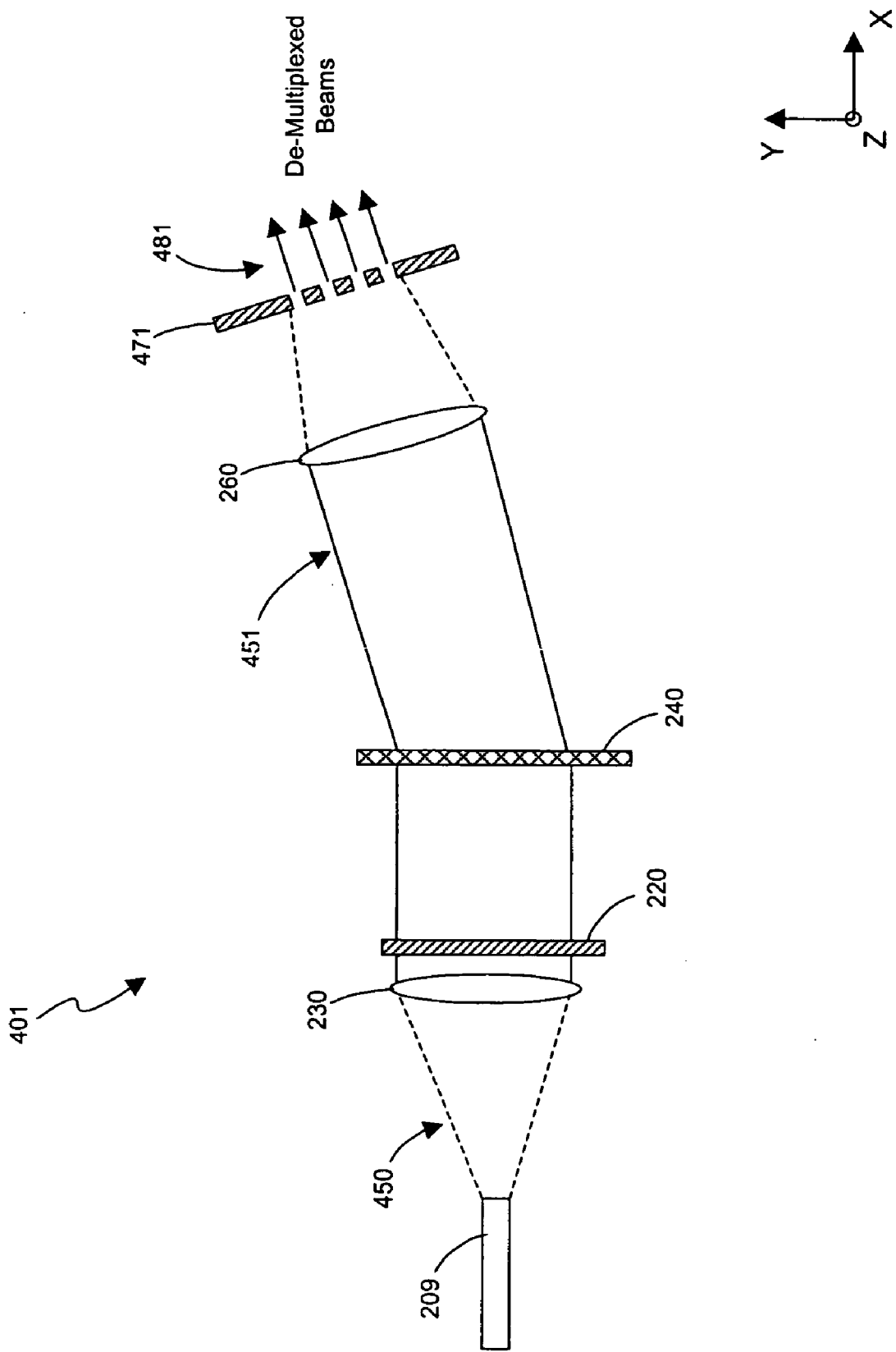
FIG. 4B is a block diagram showing an optical demultiplexer in accordance with an alternative embodiment of the invention.
Figure 4C:
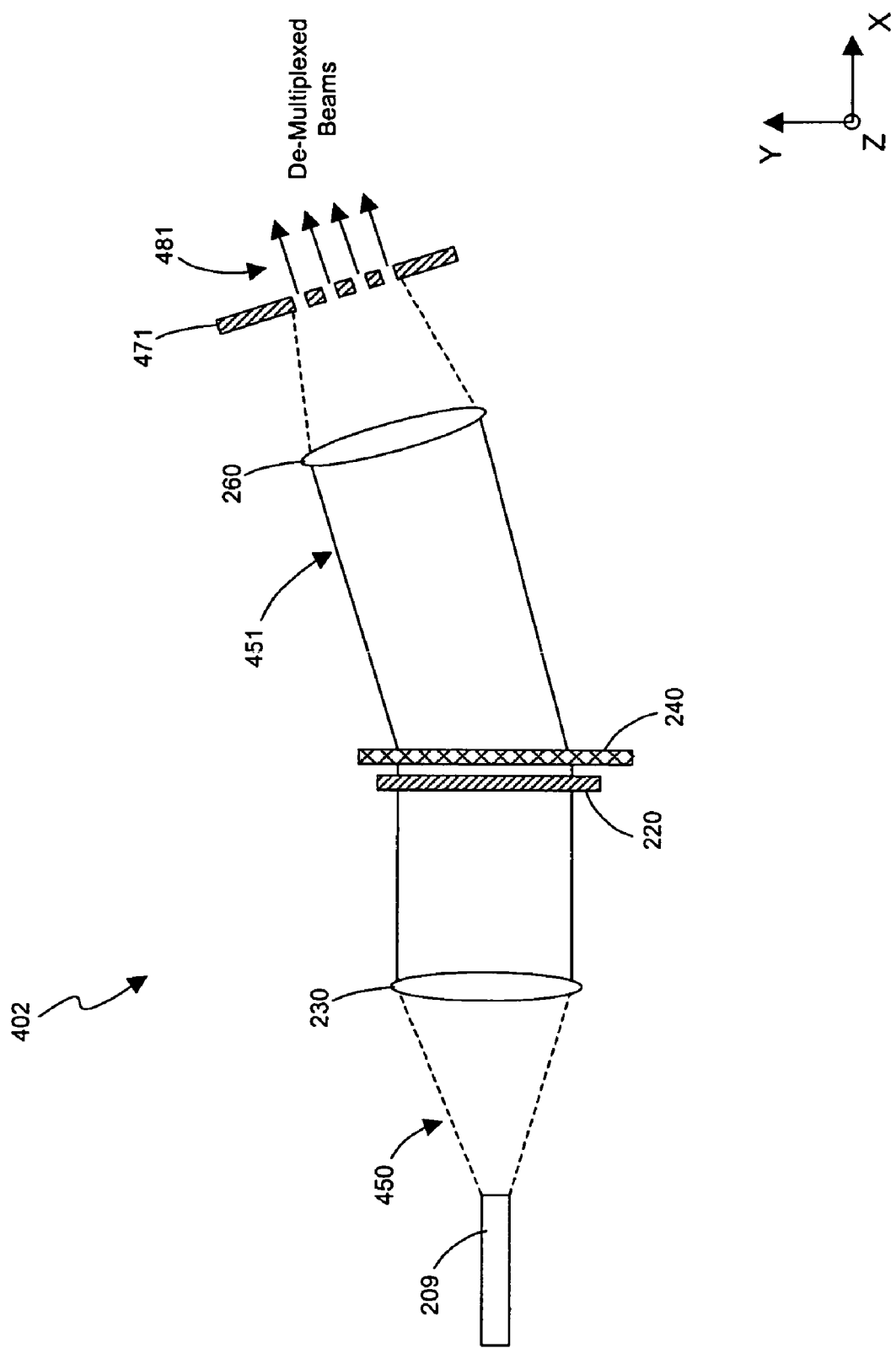
FIG. 4C is a block diagram showing an optical demultiplexer in accordance with another alternative embodiment of the invention.

Similar to the spectral filter shown in FIG. 2A, demultiplexer 400 utilizes an apodization filter positioned between imaging component 230 and input source 209. However, other configurations are possible where the apodization filter is optically disposed between imaging component 230 and diffraction grating 240. For example, FIG. 4B shows spectral filter 401 having apodization filter 220 optically disposed between imaging component 230 and diffraction grating 240. In this design, the apodization filter is located adjacent to the imaging component. Another alternative may be locating the apodization filter adjacent to the diffraction grating, as depicted in FIG. 4C.

Figure 5:
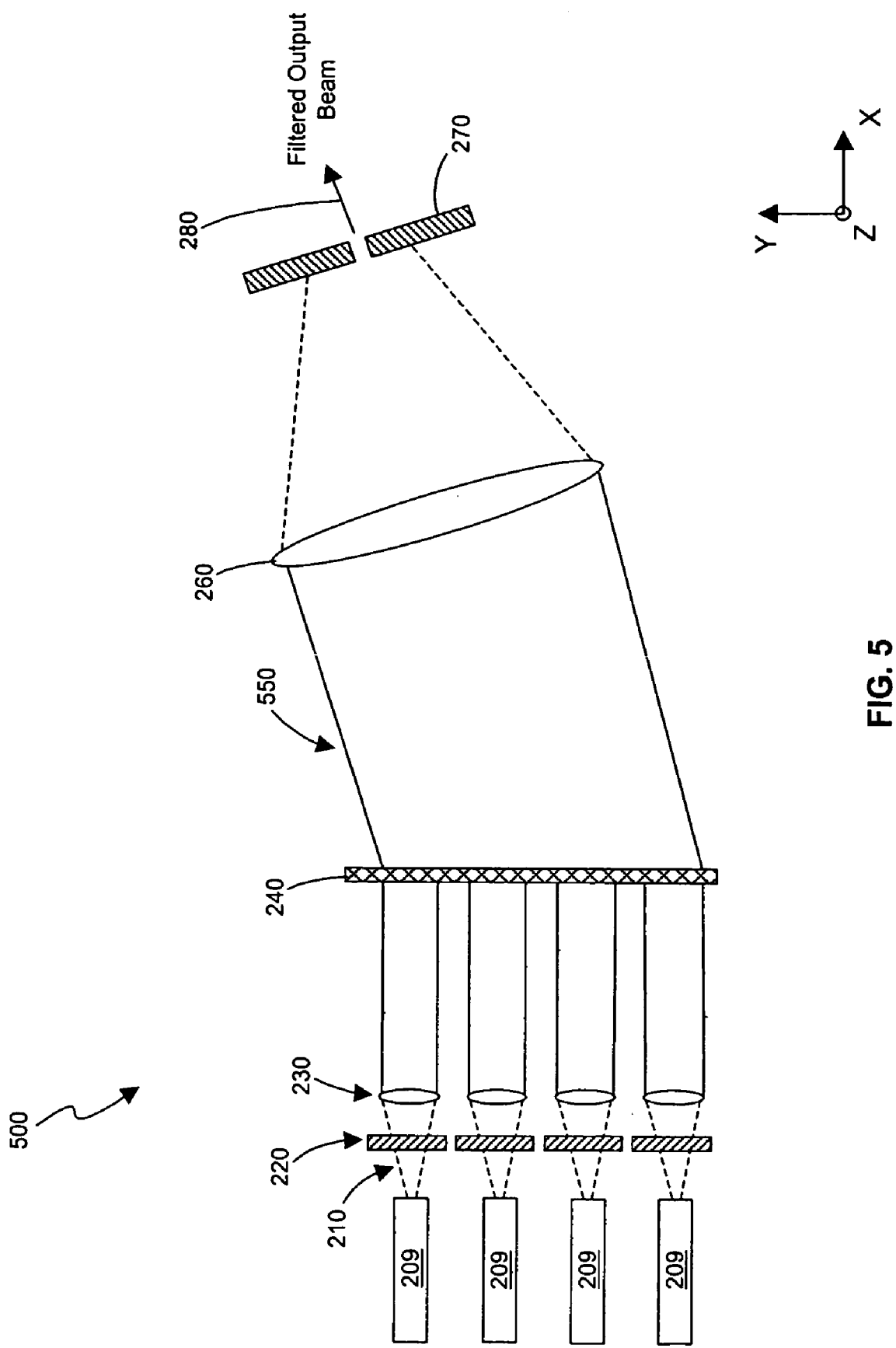
FIG. 5 is a block diagram showing an optical multiplexer in accordance with the invention.

FIG. 5 is a block diagram showing optical multiplexer 500 in accordance with one embodiment of the invention. The various components comprising optical multiplexer 500 are essentially the inverse of the components comprising optical demultiplexer 400. For example, optical multiplexer 500 is shown having apodization filters 220 and associated imaging components 230, while diffraction grating 240 is optically disposed between the plurality of imaging components 230 and imaging component 260. Spatial filter 270 is shown receiving focused output beam 550.

During operation, input sources 209 provide single-wavelength input beams 210 to associated apodization filters 220. Various imaging components 230 then collimate their associated, apodized input beams and direct these beams to diffraction grating 240. Each of the input beams will be diffracted by the diffraction grating, resulting in diffracted, spatially overlapped output beams shown in FIG. 5 as a single output beam 550. The single output beam is a multi-wavelength beam comprising each of the single-wavelength input beams. Imaging component 260 focuses the multi-wavelength output beam onto spatial filter 270, resulting in a multiplexed and filtered output beam 280.

Multiplexer 500 is shown with an apodization filter positioned between imaging components 230 and their associated input sources 209, but other configurations are possible where the apodization filter is optically disposed at almost any location between imaging components 230 and diffraction grating 240. Another alternative may be to replace the array of imaging components 230 shown in FIG. 5 with a single image component 230 that collimates each of the array of input beams 210.

FIG. 6A is a front view of one type of an apodization filter that may be implemented in various embodiments of the invention. Apodization filter 600 is a filter that has radius dependent transmissivity. As shown, the apodization filter has a series of discrete regions between maximum transmissivity at the center of the filter and minimum transmissivity at the edges of the filter. In use, light beams striking the apodization filter along the X-axis are apodized by the filter.

Maximum transmissivity region 650 is shown formed as a circular region that is generally, but not necessarily, centered on the axis of the input light beam. The portion of the input light beam incident on region 650 is transmitted through filter 600 with minimum attenuation. First intermediate transmissivity region 640 is an annular region that is bounded on the inside by region 650 and on the outside by second intermediate transmissivity region 630, which in turn is bounded by third intermediate transmissivity region 620. Region 620 is shown bounded by final transmissivity region 610. Region 610 is a region of maximum attenuation such that all, or substantial all, of the light incident on this region is blocked. The size of region 610 is such that any unwanted portion of an input beam is blocked from reaching the diffraction grating.

Figure 6B:
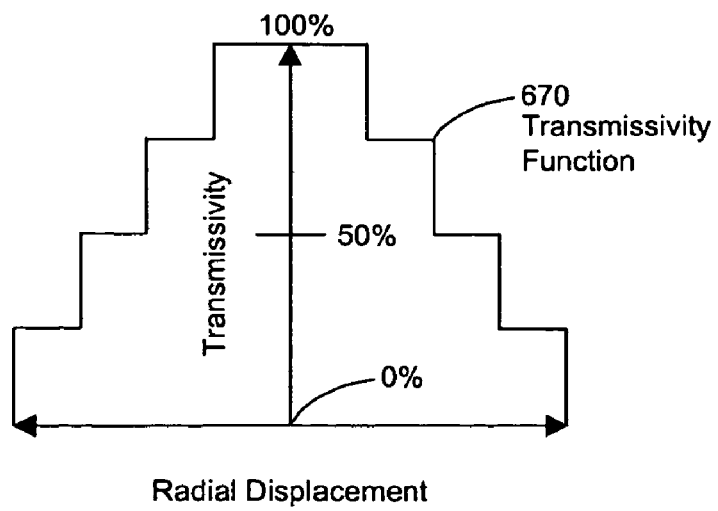
FIG. 6B is a graph of a transmissivity function of the apodization filter of FIG. 6A.

FIG. 6B is a graph of the transmissivity function of the apodization filter of FIG. 6A. In this figure, transmissivity function 670 is graphed as the transmissivity of the apodization filter as a function of the radial distance from the center of the filter. Transmissivity function 670 varies symmetrically between maximum transmission for an input light beam that is incident at or near the center of the filter, and decreasing in transmission as the radial distance from the center of the filter increases.

Transmissivity function 670 is dependent upon the number of transmissivity regions and the transmissivity functions of the various regions utilized in the filter. The filter shown in FIG. 6A includes a series of annular transmissivity regions of gradually decreasing transmissivity functions, thus providing a substantially symmetric transmissivity function 670.

Although a filter having a number of transmissivity regions and associated transmissivity functions is shown in FIG. 6A, no particular number of regions or particular transmissivity function is required or desired. An apodization filter is typically selected based upon the size and geometry of the light beam that is to be filtered. For example, a filter having a series of annular regions, such as the filter depicted in FIG. 6A, is typically implemented for filtering circular light beams. Similarly, a filter having a series of rectangular or elliptical regions, for example, of varying transmissivity functions may be utilized for respectively filtering rectangular or elliptical light beams.

Figure 7A:
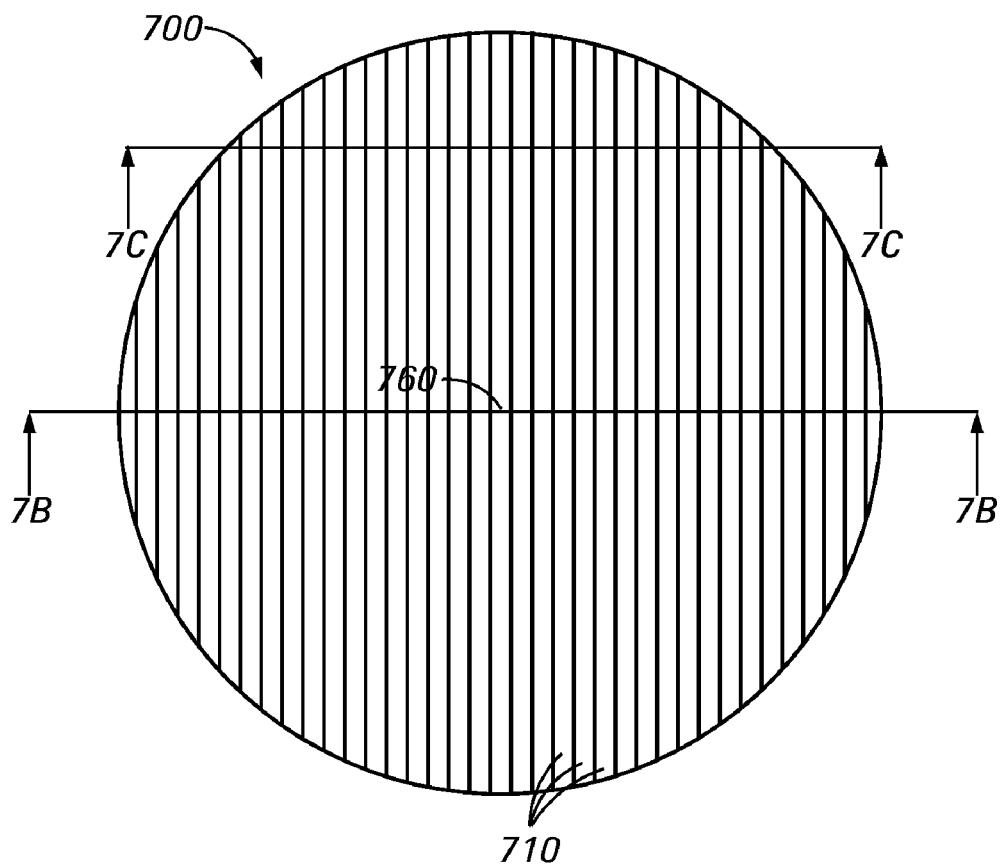
FIGS. 7A-7C show an optical grating that may be implemented in the invention, with FIG. 7A being a front view and FIGS. 7B and 7C being side views taken along cross section lines 7B-7B and 7C-7C, respectively, shown in FIG. 7A.
Figure 7B:
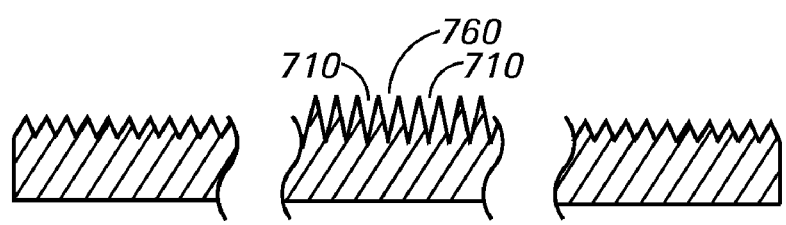
Figure 7C:
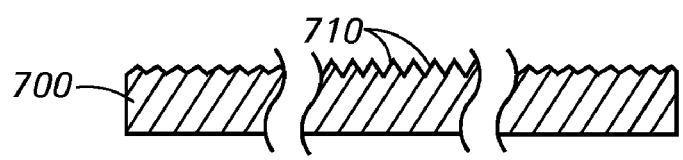

Filter 600 may also be formed with transmissivity regions of varying geometries to compensate or correct distortions or deviations of the input light beam. For example, the input light beam may be asymmetric such that the light beam does not have a perfectly spherical wavefront and circular beam. Referring back to FIG. 3, such a light beam would cause the modulation of side lobes 314 and a corresponding modulation of intensity difference 330. To correct this asymmetry, the filter may be formed with transmissivity regions that correspond to and correct the asymmetry of the input light beam FIG. 7A is a front view of diffraction grating 700 which may be utilized in accordance with the invention. FIGS. 7B and 7C are side views of grating 700 taken along cross section lines 7B-7B and 7C-7C, respectively. Grating 700 is one example of a diffraction grating that can diffract and apodize an input light beam, as will now be described.

Diffraction grating 700 is shown having a plurality of individual diffraction grooves 710 which are equally spaced and substantially parallel. As shown by FIGS. 7B and 7C, diffraction grooves 710 are defined by two projecting plane surfaces. The aggregate profile of the diffraction grooves is a sawtooth shape.

In contrast to conventional gratings, grating 700 includes variably deep diffraction grooves. For example, grating 700 is shown with grooves having the greatest depth at or near center 760 (FIG. 7B), but the depth of these grooves become relatively more shallow extending radially outward from center 760. The diffraction efficiency of the optical grating 700 (i.e., the amount of diffracted light) depends on factors such as the depth of the grooves, the angle of incidence of the light on the grating, and on the wavelength of the light. The diffraction efficiency may therefore be changed or otherwise modulated by altering one or more of these factors.

In one example, predetermined point 760 defines a location where the center of a light beam is incident on diffraction grating 700. Since point 760 is located within relatively deep groove lines, maximum diffraction of this portion of the light beam is achieved. Remaining portions of the light beam are incident on relatively shallower groove lines located at a distance from point 760. Because of the shallower groove lines, the remaining portions of the light beam experience a lesser degree of diffraction.

The varying depth of the grooves comprising diffraction grating 700 may therefore provide a change in diffraction efficiency of a light beam incident on the grating. This change of diffraction efficiency results in spatial apodization of the light beam. For example, a groove of shallower depth is generally less efficient at diffracting light than a groove of greater depth. Part of the light incident on a particular groove leaves at a stray angle, that is, at an angle other than the angle at which the incident light leaves a groove portion having maximum depth. Accordingly, an increase in the distance of a particular groove portion from predetermined point 760 causes a corresponding increase in the amount of incident light to be diffracted at the stray angle.

Care should be taken to prevent stray light from becoming part of the output beam. Stray light can be caused by spurious reflections from optical elements in the beam path. It can also be caused by a spatial overlap of the zero order (undiffracted) and the diffracted beams. This can arise if the grating pitch is made too small, which causes the angle between the undiffracted and the diffracted beams to be too small.

A particular example of a diffraction grating is depicted in FIGS. 7A-7C, but many other designs are possible. For example, the profile of the diffraction grooves may be formed using a variety of shapes including rectangular grooves having a sharply rising surface followed by a top surface, followed by a sharply falling surface, followed by a bottom surface; a mesa shaped groove having an angled rising surface followed by a top surface, followed by an angled falling surface, followed by a bottom surface; a curved groove; and a sinusoidal or a tilted sinusoidal groove. Possible changes to the profile of a diffraction groove include changing the angles along the surface of a groove, changing the sizes of the surfaces of a groove, changing curvature parameters of the groove, and implementing various types of groove shapes in a single grating.

Moreover, the diffraction grooves need not be physical grooves on the surface of a substrate. Instead, the grooves may be regions in a substrate that differ in refractive index. The difference in refractive index may be varied to modulate the diffraction efficiency of the optical grating, thus providing apodization of an input light beam.

If desired, the reflectivity of the diffraction grooves may be varied to modulate the diffraction efficiency of the grating. One way to accomplish this is to vary the thickness of a reflective metallic layer, for example, that constitutes part of the diffraction grating. In such an embodiment, the metallic layer would be thick enough at predetermined point 760 to accommodate the full skin effect so that the incident light is fully reflected. The thickness of the metallic layer may be reduced based upon the distance from the predetermined point. Thus, in some portions of the optical grating, portions of the incident light passes through the metallic layer and is not reflected.

Figure 8:
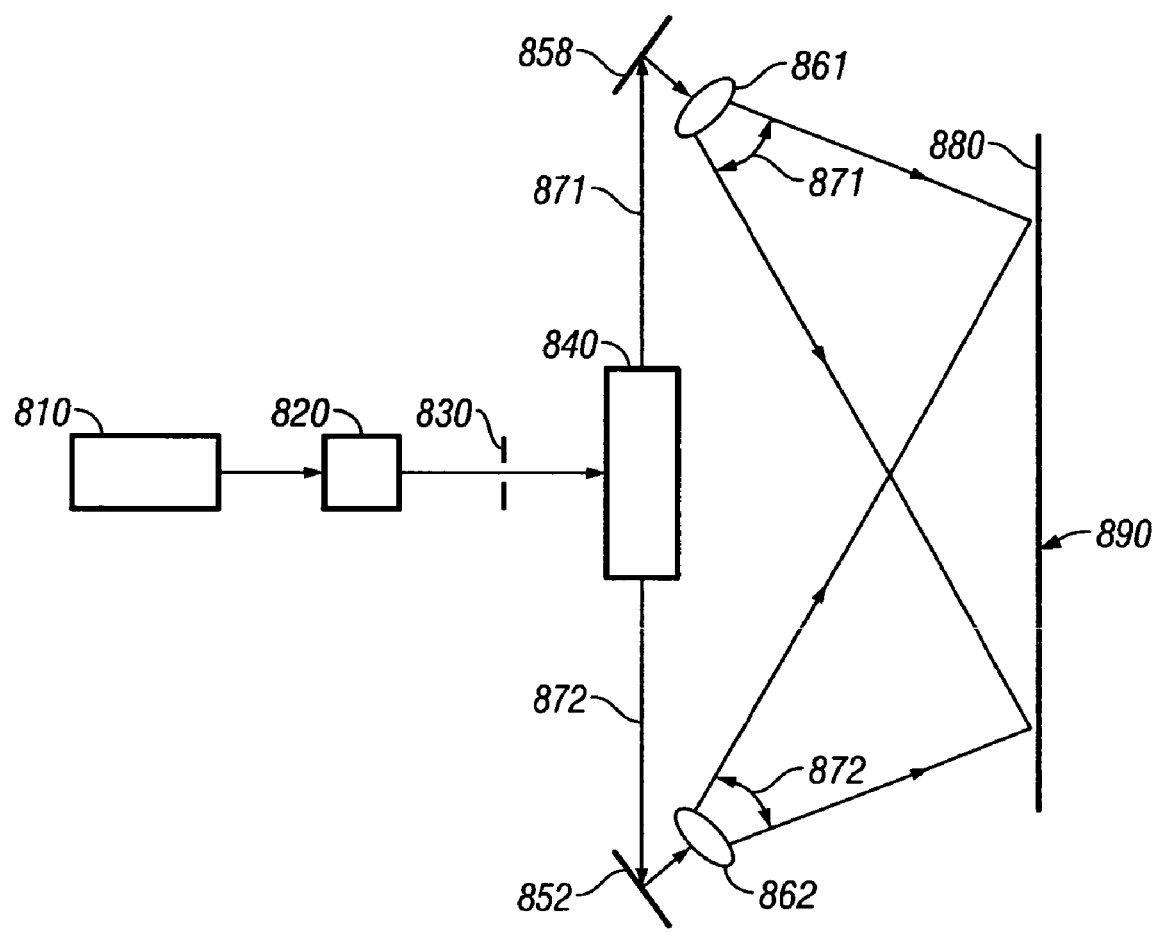
FIG. 8 is a block diagram showing components for fabricating an optical grating that diffracts and apodizes an input light beam.

FIG. 8 is a block diagram showing diffraction grating fabrication system 800. The system generally includes laser 810, beam expander 820, spatial filter 830, and beam splitter 840. Mirrors 858 and 852 are associated with imaging components 861 and 862, respectively.

In operation, laser 810 generates an exposure beam that is expanded by the beam expander and spatially filtered by spatial filter 830. The exposure beam enters beam splitter 840 where the beam is split into two exposure beams, 871 and 872. Each exposure beam 871 and 872 is reflected by mirrors 858 and 852, respectively. Imaging components 861 and 862 respectively direct exposure beams 871 and 872 onto surface 880 of substrate 890. This optical configuration causes exposure beams 871 and 872 to recombine and interfere with each other, according to the well-known principles of light wave interference and holography.

Surface 880 is coated with a suitable positive or negative photoresist. In general, when exposed to the interference pattern produced by exposure beams 871 and 872, the photoresist records the interference pattern. Using a suitable negative photoresist development process, for example, portions of the photoresist are removed leaving portions of the photoresist that had been exposed to the interference pattern. The substrate may be further processed by etching, forming a series of diffraction grooves as shown in FIGS. 7A-7C, for example. The remaining photoresist may be removed prior to use, but this is not a requirement. If a reflective diffraction grating is desired, a metal layer may be formed over the patterned substrate.

To fabricate a diffraction grating that can diffract and apodize an input light beam, the just-described process may be modified by adjusting beam expander 820 or spatial filter 830, or both, so that the intensities of exposure beams 871 and 872 decrease with increasing radial displacement in the beams. If desired, an apodization filter may be added to the path of exposure beam 871, exposure beam 872, or both of these beams.

Each exposure beam may be a Gaussian function and as such, a simple way to fabricate a diffraction grating with a radial Gaussian apodization function is to insufficiently expand either one or both of the exposure beams, which would result in a non-uniform intensity exposure across surface 880. Alternatively, mirror 858 or imaging element 861, or both, may be adjusted so that exposure beam 871 is not completely collimated as it strikes substrate 880. The interference pattern generated by this configuration defines a pattern of irregular grooves (i.e., grooves that are not straight, not parallel, not uniformly spaced, do not have uniform depth, and the like).

Figure 9:
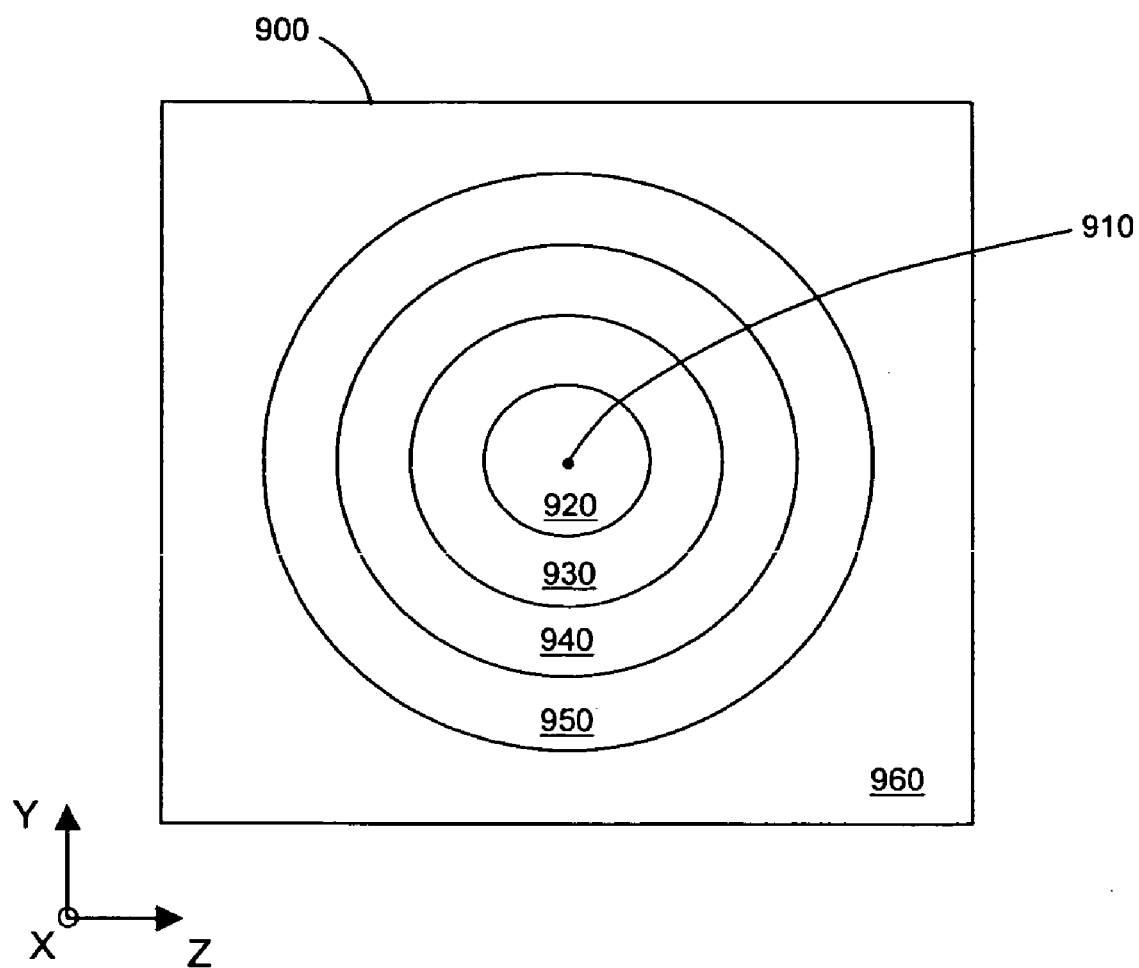
FIG. 9 is a front view of an apodizing phase plate that may be implemented in the invention to augment or replace the apodizing filter.

FIG. 9 is a front view of phase plate 900 that may be utilized to augment or replace apodizing filter 220. Similar to apodization filter 220, the phase plate may be implemented as a separate component that is optically disposed between input light source 209 and diffraction grating 240.

Alternatively, the functionality of the phase plate maybe be integrated with imaging 230, diffraction grating 240, or apodization filter 220.

In general, the phase plate apodizes an incident input light beam by changing the phase of portions of the beam before the beam is diffracted. The amount of the phase change is spatially-dependent. Spatially-dependent phase change is a phase change from a reference point in a plane normal to the direction of the light and depends on a radial displacement or a linear displacement.

Phase change may be accomplished using any of a variety of conventional phase changing methods and devices that alters the optical path length of the beam in a spatially dependent way. In other words, the optical path length change is not uniform across the beam. The optical path is made up of two components whose product yields the optical path length. Those two components are the physical path length and the index of refraction. These two components multiplied together (and integrated over the physical path) will yield the phase change. Therefore, spatially dependent phase change may be realized by spatially dependent changes in the refractive index across the device, by varying the physical thickness across the device, or a combination of both.

Referring still to FIG. 9, the phase plate is shown having a series of discrete refractive index regions starting at center 910 of the plate and progressing outward in a radial direction. Refractive index region 920 is shown formed as a circular region that is generally, but not necessarily, centered on the axis of the input light beam. A series of discrete refractive index regions, 920, 930, 940, and 950 are shown formed as a series of annular regions that are bounded by region 960. Each of the refractive index regions contain a different refractive index, and the size of region 960 is such that any unwanted portion of an input beam is blocked from reaching the diffraction grating.

When an input beam having spatially-dependent phase is diffracted by the diffraction grating, the phase of a light beam portion being diffracted affects the communication of that portion of the output light beam. Apodization techniques based upon spatially-dependent phase alteration of the input beam typically operate with input beams in a relatively narrow frequency range.

While the invention has been described in detail with reference to disclosed embodiments, various modifications within the scope of the invention will be apparent. It is to be appreciated that features described with respect to one embodiment typically may be applied to other embodiments. Therefore, the invention properly is to be construed with reference to the claims.

What is claimed is:

1. A spectral filter, comprising:
a collimating optical element configured to collimate an input light beam;
an apodizing filter configured to spatially filter said input light beam, said apodizing filter one of (a) preceding and (b) following said collimating optical element, wherein said apodizing filter comprises a range of transmissivity that varies according to a distance from a predetermined location on said apodizing filter;
a diffraction grating configured to receive said collimated and apodized input light beam and produce a diffracted light beam;
a focusing optical element configured to receive said diffracted light beam and to produce a focused light beam; and
a spatial filter arranged to receive said focused light beam.

2. The spectral filter according to claim 1, said spectral filter further comprising a positioning mechanism configured to adjust a relative angular relationship between said diffraction grating and said spatial filter.

3. The spectral filter according to claim 1, said spectral filter further comprising a positioning mechanism configured to adjust a relative angular relationship between said diffraction grating and said collimating optical element.

4. The spectral filter according to claim 1, said spectral filter further comprising:
a plurality of spatial filters arranged to receive said focused light beam, wherein each filter of said plurality of spatial filters filters said focused light beam to produce a corresponding plurality of demultiplexed light beams.

5. The spectral filter according to claim 4, wherein each of said plurality of spectral filters comprises a photodetector.

6. The spectral filter according to claim 4, wherein each of said plurality of spectral filters comprises a waveguide.

7. The spectral filter according to claim 4, wherein said plurality of spectral filters comprises a photodetector array.

8. The spectral filter according to claim 4, wherein said spectral filter further comprises a plurality of photodetectors, each arranged to receive one of said plurality of demultiplexed light beams.

9. The spectral filter according to claim 4, wherein said spectral filter further comprises a plurality of waveguides, each arranged to receive one of said plurality of demultiplexed light beams.

10. The spectral filter according to claim 4, wherein said spectral filter further comprises a photodetector array arranged to receive said plurality of demultiplexed light beams.

11. The spectral filter according to claim 1, said spectral filter further comprising:
additional collimating optical elements and respective additional apodizing filters, each configured to derive a respective apodized and collimated light beam from an associated input light beam having a distinct wavelength, each of said additional apodizing filters comprising a range of transmissivity that varies according to a distance from a predetermined location on each particular additional apodizing filter; and wherein
said diffraction grating is configured to receive said apodized and collimated light beams to produce said diffracted light beam.

12. The spectral filter according to claim 1, wherein said spectral filter further comprises:
an apodizing phase plate configured to further spatially filter said input light beam, wherein said phase plate comprises a refractive index that varies radially according to a distance from a predetermined location on said apodizing phase plate.

13. The spectral filter according to claim 12, wherein said refractive index corrects at least a portion of any phase asymmetry present in said input light beam.

14. The spectral filter according to claim 1, wherein said spectral filter further comprises:
an apodizing phase plate configured to further spatially filter said input light beam, wherein said phase plate comprises a thickness that varies according to a distance from a predetermined location on said apodizing phase plate.

15. The spectral filter according to claim 14, wherein said varying thickness corrects at least a portion of any phase asymmetry present in said input light beam.

16. The spectral filter according to claim 1, wherein said apodizing filter is located between said collimating optical element and an input light source that produces said input light beam.

17. The spectral filter according to claim 1, wherein said apodizing filter is located between said collimating optical element and said diffraction grating.

18. The spectral filter according to claim 1, wherein said apodizing filter and said collimating optical element are integrated.

19. The spectral filter according to claim 1, wherein said apodizing filter and said diffraction grating are integrated.

20. The spectral filter according to claim 1, wherein said diffraction grating is a transmission diffraction grating.

21. The spectral filter according to claim 1, wherein said diffraction grating is a reflective diffraction grating.

22. The spectral filter according to claim 1, wherein said spatial filter comprises a photodetector.

23. The spectral filter according to claim 1, wherein said spatial filter comprises a waveguide.

24. The spectral filter according to claim 1, wherein said spectral filter further comprises a photodetector arranged to receive said focused light beam from said spatial filter.

25. The spectral filter according to claim 1, wherein said spectral filter further comprises a waveguide arranged to receive said focused light beam from said spatial filter.

26. A method for filtering light, the method comprising:
collimating an input light beam;
apodizing said input light beam;
diffracting said collimated and apodized input light beam to produce a diffracted light beam;
focusing said diffracted light beam to produce a focused light beam; and spatially filtering said focused light beam to produce a spatially-filtered output light beam.

27. The method according to claim 26, said method further comprising:
adjusting a relative angular relationship between said diffracting and said filtering.

28. The method according to claim 26, said method further comprising:
adjusting a relative angular relationship between said diffracting and said collimating.

29. The method according to claim 26, wherein said filtering produces demultiplexed light beams, wherein each of said demultiplexed light beams comprises a component of said input light beam based on wavelength.

30. The method according to claim 26, said method further comprising:
collimating and apodizing at least one additional input light beam to produce at least one respective additional apodized and collimated light beam, said at least one additional input light beam and said input light beam having distinct wavelengths; and
diffracting said at least one additional apodized and collimated light beam to produce said diffracted light beam.

31. The method according to claim 26, wherein said apodizing is provided by an apodizing filter comprising a range of transmissivity that varies according to a distance from a predetermined location on said apodizing filter.

32. The method according to claim 26, wherein said apodizing is provided by an apodizing phase plate comprising a refractive index that varies radially according to a distance from a predetermined location on said apodizing phase plate.

33. The method according to claim 32, wherein said refractive index corrects at least a portion of any phase asymmetry present in said input light beam.

34. The method according to claim 26, wherein said apodizing is provided by an apodizing phase plate comprising a thickness that varies according to a distance from a predetermined location on said apodizing phase plate.

35. The method according to claim 34, wherein said varying thickness corrects at least a portion of any phase asymmetry present in said input light beam.

36. The method according to claim 26, wherein said apodizing is performed before said collimating.

37. The method according to claim 26, wherein said apodizing is performed after said collimating.

38. A spectral filter, comprising:
  a collimating optical element configured to collimate an input light beam;
  an apodizing phase plate one of (a) preceding and (b) following said collimating optical element, said apodizing phase plate configured to spatially filter said input light beam, wherein said phase plate comprises a refractive index that varies radially according to a distance from a predetermined location on said phase plate;
  a diffraction grating configured to receive said collimated and apodized input light beam and produce a diffracted light beam;
  a focusing optical element configured to receive said diffracted light beam and produce a focused light beam; and
  a spatial filter arranged to receive said focused light beam.

39. The spectral filter according to claim 38, wherein said phase plate further comprises a thickness that varies according to a distance from a predetermined location on said phase plate.

* * * * *